(12) United States Patent
Naito

(10) Patent No.: US 12,434,405 B2
(45) Date of Patent: Oct. 7, 2025

(54) METHOD AND DEVICE FOR PRODUCING HONEYCOMB STRUCTURE

(71) Applicant: NGK INSULATORS, LTD., Nagoya (JP)

(72) Inventor: Yuto Naito, Hashima-Gun (JP)

(73) Assignee: NGK INSULATORS, LTD., Nagoya (JP)

(*) Notice: Subject to any disclaimer, the term of this patent is extended or adjusted under 35 U.S.C. 154(b) by 460 days.

(21) Appl. No.: 17/452,440

(22) Filed: Oct. 27, 2021

(65) Prior Publication Data
US 2022/0288811 A1      Sep. 15, 2022

(30) Foreign Application Priority Data
Mar. 9, 2021 (JP) .................................. 2021-037746

(51) Int. Cl.
*B28B 3/26* (2006.01)
*B29C 48/11* (2019.01)
*B29L 31/60* (2006.01)

(52) U.S. Cl.
CPC .............. *B28B 3/269* (2013.01); *B29C 48/11* (2019.02); *B29L 2031/608* (2013.01); *F01N 2330/30* (2013.01)

(58) Field of Classification Search
CPC ....... B05C 1/022; B05C 5/0241; B05C 11/04; B05C 11/08; B05C 5/0291; B05D 1/002;
(Continued)

(56) References Cited

U.S. PATENT DOCUMENTS 6,939,522 B1   9/2005  Harada et al.
7,981,476 B2 * 7/2011  Noro ..................... B05C 5/0208
                                                 118/232
(Continued)

FOREIGN PATENT DOCUMENTS

DE      600 09 463 T2      1/2005
JP      2010221165 A  *   10/2010
(Continued)

OTHER PUBLICATIONS

Japanese Office Action (with English translation) dated Jun. 20, 2024 (Application No. 2021-037746).
(Continued)

*Primary Examiner* — Xiao S Zhao
*Assistant Examiner* — Victoria Bartlett
(74) *Attorney, Agent, or Firm* — BURR PATENT LAW, PLLC

(57) ABSTRACT

A method for producing a honeycomb structure according to the present invention includes: a preparation step of preparing a honeycomb structure element 2 having plurality of slits 12; and a filling step of filling the plurality of slits 12 with a filling material 13 by a contacting member 3 by feeding the filling material 13 to an outer peripheral surface 20 of the honeycomb structure element 2, and rotating the honeycomb structure element 2 while pressing a tip portion 3a of the contacting member 3 inclined at an angle relative to a normal line 20a of the outer peripheral surface 20 of the honeycomb structure element 2 against the outer peripheral surface 20 with a force, to obtain the honeycomb structure having the plurality of slits 12 filled with the filling material 13.

7 Claims, 5 Drawing Sheets

(58) Field of Classification Search
CPC ..... B28B 11/04; B28B 3/269; B28B 19/0038; B29C 48/11; B29L 2031/608; C04B 41/00; F01N 2330/30
See application file for complete search history.

(56) References Cited

U.S. PATENT DOCUMENTS

| | | |
|---|---|---|
| 2007/0243357 A1* | 10/2007 | Ichikawa .............. C04B 35/195 |
| | | 428/116 |
| 2010/0055332 A1 | 3/2010 | Domey et al. |
| 2014/0291315 A1 | 10/2014 | Mase et al. |
| 2015/0260066 A1 | 9/2015 | Hosoi et al. |
| 2018/0222083 A1* | 8/2018 | Nagai ................. C04B 38/0012 |
| 2019/0193067 A1* | 6/2019 | Yamada ................ F01N 3/0222 |

FOREIGN PATENT DOCUMENTS

| | | |
|---|---|---|
| JP | 2012-501258 A | 1/2012 |
| JP | 2014-198296 A | 10/2014 |
| JP | 2015-174011 A | 10/2015 |

OTHER PUBLICATIONS

German Office Action (with English translation) dated Jun. 12, 2025 (Application No. 10 2021 212 969.2).

* cited by examiner

METHOD AND DEVICE FOR PRODUCING HONEYCOMB STRUCTURE

FIELD OF THE INVENTION

The present invention relates to a method and device for producing a honeycomb structure.

BACKGROUND OF THE INVENTION

Patent Literature 1 as described below discloses a honeycomb structure in which one or more slits opening on side surfaces are formed in a honeycomb structure portion to improve thermal shock resistance of the honeycomb structure. Further, it proposes that at least one of the slits is filled with a filling material to prevent gas passing through the honeycomb structure from leaking out from the above slits to the outer peripheral side of the honeycomb structure while maintaining the thermal shock resistance. Patent Literature 1 discloses a method of filling the slit with the filling material using a syringe or a spatula.

CITATION LIST

Patent Literatures

[Patent Literature 1] Japanese Patent Application Publication No. 2015-174011 A

SUMMARY OF THE INVENTION

Conventionally, the filling of the slit with the filling material has been manually performed by an operator, regardless of whether it has been performed with a syringe or a spatula. Therefore, in the conventional method for producing the honeycomb structure, accuracy of the filling material may vary depending on the operator.

The present invention has been made to solve the above problems. One of objects of the present invention is to provide a method and device for producing a honeycomb structure, which can reduce a variation in filling accuracy of a filling material.

The method for producing a honeycomb structure according to an embodiment of the present invention is a method for producing a honeycomb structure, the honeycomb structure comprising: an outer peripheral wall; a partition wall arranged on an inner side of the outer peripheral wall, the partition wall defining a plurality of cells each extending from one end face to other end face to form a flow path; a plurality of slits spaced apart from each other in a circumferential direction and extending inwardly in a radial direction from the outer peripheral wall, the plurality of slits being provided such that the outer peripheral wall is opened; and a filling material filling each of the slits, wherein the method comprises: a preparation step of preparing a honeycomb structure element having the plurality of slits; and a filling step of filling the plurality of slits with the filling material by a contacting member by feeding the filling material to an outer peripheral surface of the honeycomb structure element, and rotating the honeycomb structure element while pressing a tip portion of the contacting member inclined at an angle relative to a normal line of the outer peripheral surface of the honeycomb structure element against the outer peripheral surface with a force, to obtain the honeycomb structure having the plurality of slits filled with the filling material.

The device for producing a honeycomb structure according to an embodiment of the present invention is a device for producing a honeycomb structure, the honeycomb structure comprising: an outer peripheral wall; a partition wall arranged on an inner side of the outer peripheral wall, the partition wall defining a plurality of cells each extending from one end face to other end face to form a flow path; a plurality of slits spaced apart from each other in a circumferential direction and extending inwardly in a radial direction from the outer peripheral wall, the plurality of slits being provided such that the outer peripheral wall is opened; and a filling material filling each of the slits, wherein the device comprises: an element support portion for rotatably supporting a honeycomb structure element having the plurality of slits; and a contacting member support portion for pressing a tip portion of a contacting member inclined at an angle relative to a normal line of an outer peripheral surface of the honeycomb structure element against the outer peripheral surface with a force, and wherein the device is configured to fill the plurality of slits with the filling material by the contacting member by rotating the honeycomb structure element with the element support portion, while pressing the tip portion of the contacting member supported by the contacting member support portion against the outer peripheral surface while feeding the filling material to the outer peripheral surface of the honeycomb structure element.

According to the method and device for producing the honeycomb structure, a variation in filling accuracy of the filling material can be reduced, because the plurality of slits are filled with the filling material by the contacting member by feeding the filling material to the outer peripheral surface of the honeycomb structure element, and rotating the honeycomb element while pressing the tip portion of the contacting member inclined at an angle relative to the normal line of the outer peripheral surface of the honeycomb structure element against the outer peripheral surface with a force, to obtain the honeycomb structure having the plurality of slits filled with the filling material.

DETAILED DESCRIPTION OF THE INVENTION

Hereinafter, embodiments for carrying out the present invention will be described with reference to the drawings. The present invention is not limited to each embodiment, and components can be modified and embodied without departing from the spirit of the present invention. Further, various inventions can be formed by appropriately combining a plurality of components disclosed in each embodiment. For example, some components may be removed from all of the components shown in the embodiments. Furthermore, the components of different embodiments may be optionally combined.

Figure 1:
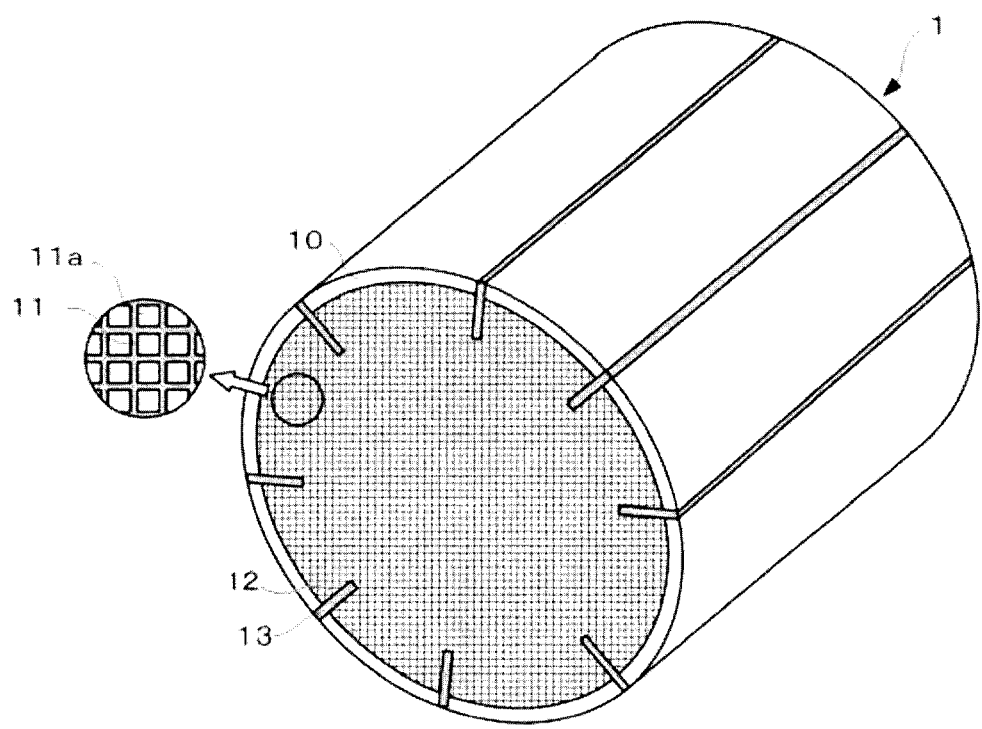
FIG. 1 is a perspective view showing a honeycomb structure produced by a method for producing a honeycomb structure according to an embodiment of the present invention.

FIG. 1 is a perspective view showing a honeycomb structure 1 produced by a method for producing the honeycomb structure 1 according to an embodiment of the present invention. The honeycomb structure 1 shown in FIG. 1 is a pillar shaped member made of ceramics, and includes: an outer peripheral wall 10; and a partition wall 11 which is arranged on an inner side of the peripheral wall 10 and define a plurality of cells 11a each extending from one end face to other end face to form a flow path. The pillar shape is understood as a three-dimensional shape having a thickness in an extending direction of the cells 11a (axial direction of the honeycomb structure 1). A ratio of an axial length of the honeycomb structure 1 to a diameter or width of the end face of the honeycomb structure 1 (aspect ratio) is arbitrary. The pillar shape may also include a shape in which the axial length of the honeycomb structure 1 is shorter than the diameter or width of the end face (flat shape).

An outer shape of the honeycomb structure 1 is not particularly limited as long as it has a pillar shape. For example, it can be other shapes such as a pillar shape having circular end faces (cylindrical shape), a pillar shape having oval end faces, and a pillar shape having polygonal (rectangular, pentagonal, hexagonal, heptagonal, octagonal, etc.) end faces. As for the size of the honeycomb structure 1, an area of the end faces is preferably from 2,000 to 20,000 mm$^2$, and even more preferably from 5,000 to 15,000 mm$^2$, in order to increase heat resistance (to suppress cracks generated in the circumferential direction of the outer peripheral wall).

A shape of each cell in the cross section perpendicular to the extending direction of the cells 11a may preferably be a quadrangle, hexagon, octagon, or a combination thereof. Among these, the quadrangle and the hexagon are preferred. Such a cell shape can lead to a decreased pressure loss when an exhaust gas flows through the honeycomb structure 1, which can provide improved purification performance.

Each of the partition wall 11 that defines the cells 11a preferably has a thickness of from 0.1 to 0.3 mm, and more preferably from 0.1 to 0.2 mm. The thickness of 0.1 mm or more of each partition wall 11 can suppress a decrease in the strength of the honeycomb structure 1. The thickness of each partition wall 11 of 0.3 mm or less can suppress a larger pressure loss when an exhaust gas flows through the honeycomb structure 1 if the honeycomb structure 1 is used as a catalyst support to support a catalyst. In the present invention, the thickness of each partition wall 11 is defined as a length of a portion passing through the partition wall 11, among line segments connecting the centers of gravity of adjacent cells 11a, in the cross section perpendicular to the extending direction of the cells 11a.

The honeycomb structure 1 preferably has a cell density of from 40 to 150 cells/cm$^2$, and more preferably from 70 to 100 cells/cm$^2$, in the cross section perpendicular to the extending direction of the cells 11a. The cell density in such a range can allow the purification performance of the catalyst to be increased while reducing the pressure loss when the exhaust gas flows. The cell density of 40 cells/cm$^2$ or more can allow a catalyst support area to be sufficiently ensured. The cell density of 150 cells/cm$^2$ or less can prevent the pressure loss when the exhaust gas flows through the honeycomb structure 1 from being increased if the honeycomb structure 1 is used as a catalyst support to support the catalyst. The cell density is a value obtained by dividing the number of cells by the area of one end face portion of the honeycomb structure 1 excluding the outer peripheral wall 10 portion.

The provision of the outer peripheral wall 10 of the honeycomb structure 1 is useful from the viewpoints of ensuring the structural strength of the honeycomb structure 1 and suppressing the leakage of fluid flowing through the cells 11a from the outer perimeter wall 10. Specifically, the thickness of the outer peripheral wall 10 is preferably 0.05 mm or more, and more preferably 0.10 mm or more, and even more preferably 0.15 mm or more. However, if the outer peripheral wall 10 is too thick, the strength will be too high, and a strength balance between the outer peripheral wall 10 and the partition wall 11 will be lost, resulting in a decrease in thermal shock resistance. Therefore, the thickness of the outer peripheral wall 10 is preferably 1.0 mm or less, and more preferably 0.7 mm or less, and even more preferably 0.5 mm or less. The thickness of the outer peripheral wall 10 is defined as a thickness of the outer peripheral wall in the normal line direction relative to the tangent line at a measured point when the point of the outer peripheral wall 10 where the thickness is to be measured is observed in the cross section perpendicular to the extending direction of the cells.

The honeycomb structure 1 is made of ceramics and is preferably electrically conductive. Volume resistivity is not particularly limited as long as the honeycomb structure 1 is capable of heat generation by Joule heat when a current is applied. Preferably, the volume resistivity is from 0.1 to 200 Ωcm, and more preferably from 1 to 200 Ωcm. As used herein, the volume resistivity of the honeycomb structure 1 refers to a value measured at 25° C. by the four-terminal method.

The honeycomb structure 1 can be made of a material selected from the group consisting of oxide ceramics such as alumina, mullite, zirconia and cordierite, and non-oxide ceramics such as silicon carbide, silicon nitride and aluminum nitride, although not limited thereto. Further, silicon carbide-metal-silicon composites and silicon carbide/graphite composites can also be used. Among these, it is preferable that the material of the honeycomb structure 1 contains ceramics mainly based on a silicon-silicon carbide composite material or silicon carbide, in terms of balancing heat resistance and electrical conductivity. The phrase "the material of the honeycomb structure 1 is mainly based on silicon-silicon carbide composite material" means that the honeycomb structure 1 contains 90% by mass of more of silicon-silicon carbide composite material (total mass) based on the total material. Here, the silicon-silicon carbide composite material contains silicon carbide particles as an aggregate and silicon as a binding material to bind the silicon carbide particles, preferably in which a plurality of silicon carbide particles are bound by silicon such that pores are formed between the silicon carbide particles. The phrase "the material of the honeycomb structure 1 is mainly based on silicon carbide" means that the honeycomb structure 1 contains 90% or more of silicon carbide (total mass) based on the total material.

When the honeycomb structure 1 contains the silicon-silicon carbide composite material, a ratio of the "mass of silicon as a binding material" contained in the honeycomb structure 1 to the total of the "mass of silicon carbide particles as an aggregate" contained in the honeycomb structure 1 and the "mass of silicon as a binding material" contained in the honeycomb structure 1 is preferably from 10 to 40% by mass, and more preferably from 15 to 35% by mass.

The partition wall 11 may be porous. When the partition wall 11 is porous, the porosity of the partition wall 11 is preferably from 35 to 60%, and even more preferably from 35 to 45%. The porosity is a value measured by a mercury porosimeter.

The partition wall 11 of the honeycomb structure 1 preferably has an average pore diameter of from 2 to 15 μm, and even more preferably from 4 to 8 μm. The average pore diameter is a value measured by a mercury porosimeter.

The honeycomb structure 1 is provided with a plurality of slits 12 that are spaced apart from each other in the circumferential direction and are arranged so as to extend inwardly in the radial direction from the outer peripheral wall 10 to open the outer peripheral wall 10. The slits 12 extends straightly in the axial direction of the honeycomb structure 1 from one end face of the honeycomb structure 1 to the other end face of the honeycomb structure 1. The number of the slits 12 in the circumferential direction may be 2 or more and 12 or less. Each slit 12 preferably has a depth of 60% or less, more preferably 1% or more and 25% or less, of the radius of the honeycomb structure 1 in the cross section perpendicular to the axial direction of the honeycomb structure 1. The width of each slit 12 may be 0.4 mm or more and 2.0 mm or less.

The slits 12 are filled with a filling material 13. The filling material 13 is filled in at least a part of a space of each slit 12. The filling material 13 is preferably filled in 50% or more of the space of the slit 12, and the filling material 13 is more preferably filled in the entire space of the slit 12. In the embodiment as shown in FIG. 1, the filling material 13 is filled in the entire space of each slit 12 to form a plane integrated with both end faces of the honeycomb structure 1 and a curved surface integrated with the outer peripheral wall 10 of the honeycomb structure 1. However, the filling material 13 may be filled to a position on an axially inner side than the end faces of the honeycomb structure 1, or may be filled to a position on an inner side in a radial or width direction than the outer peripheral wall 10 of the honeycomb structure 1.

When the main component of the honeycomb structure 1 is silicon carbide or metal silicon-silicon carbide composite, the filling material 13 preferably contains at least 20% by mass silicon carbide, and more preferable from 20 to 70% by mass of silicon carbide. This can allow a thermal expansion coefficient of the filling material 13 to be close to that of the honeycomb structure, thereby improving the thermal shock resistance of the honeycomb structure. The filling material 13 may contain 30% by mass or more of silica, alumina, or the like.

Although not shown, a pair of electrode layers each extending in the form of band in the extending direction of the cells 11a may be provided on the outer peripheral surface of the honeycomb structure 1, and electrode terminals may be provided on these electrode layers. A voltage can be applied to the honeycomb structure 1 through those electrode terminals and electrode layers to generate heat in the honeycomb structure 1.

The volume resistivity of the electrode layers is preferably 1/200 or more and 1/10 or less of that of the honeycomb structure 1, in terms of facilitating the flow of electricity to the electrode layers.

Each electrode layer may be made of conductive ceramics, a metal, or a composite material (cermet) of a metal and a conductive ceramic. Examples of the metal include a single metal of Cr, Fe, Co, Ni, Si or Ti, or alloys containing at least one metal selected from the group consisting of those metals. Non-limiting examples of the conductive ceramics include silicon carbide (SiC), and metal compounds such as metal silicides such as tantalum silicide ($TaSi_2$) and chromium silicide ($CrSi_2$).

As a method for producing the honeycomb structure 1 having the electrode layers, first, an electrode layer forming raw material containing ceramic materials is applied onto side surfaces of a honeycomb dry body and dried to form a pair of unfired electrode layers on the outer surface of the outer peripheral wall so as to extend in the form of band in the extending direction of the cells 11a, across the central axis of the honeycomb dry body, thereby providing a honeycomb dried body with unfired electrode layers. Then, the honeycomb dried body with unfired electrode layers is fired to produce a honeycomb fired body having a pair of electrode layers. According this method, the honeycomb structure 1 having the electrode layers is obtained.

Figure 2:
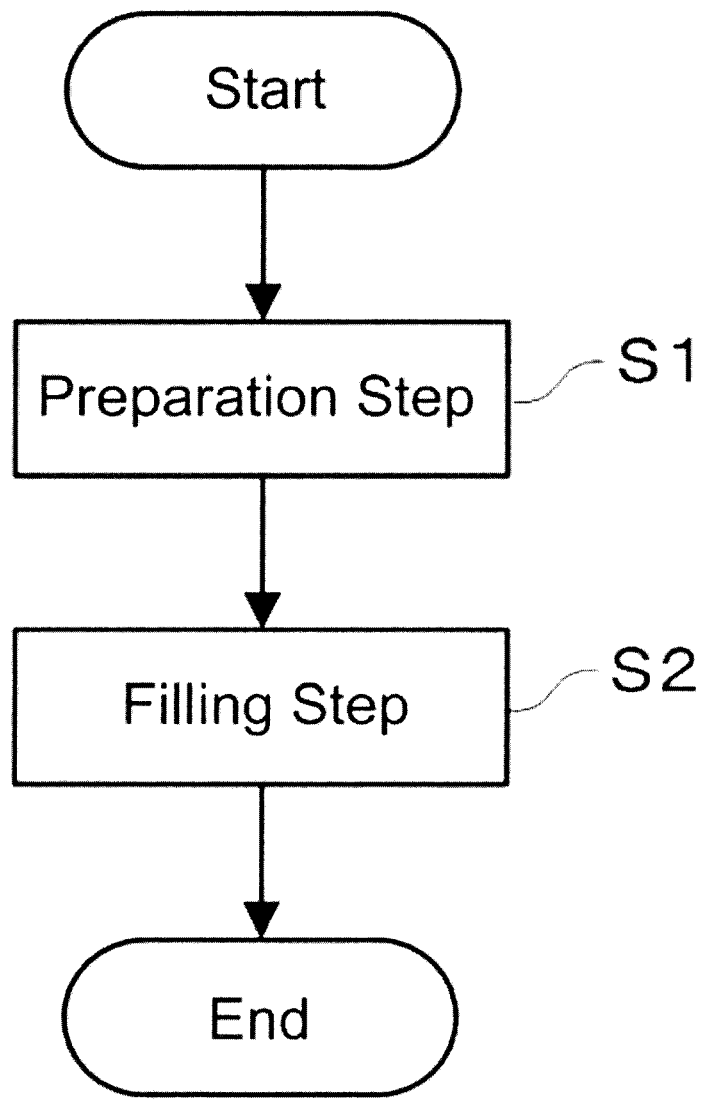
FIG. 2 is a flowchart showing a method for producing a honeycomb structure, for producing the honeycomb structure in FIG. 1.
Figure 3:
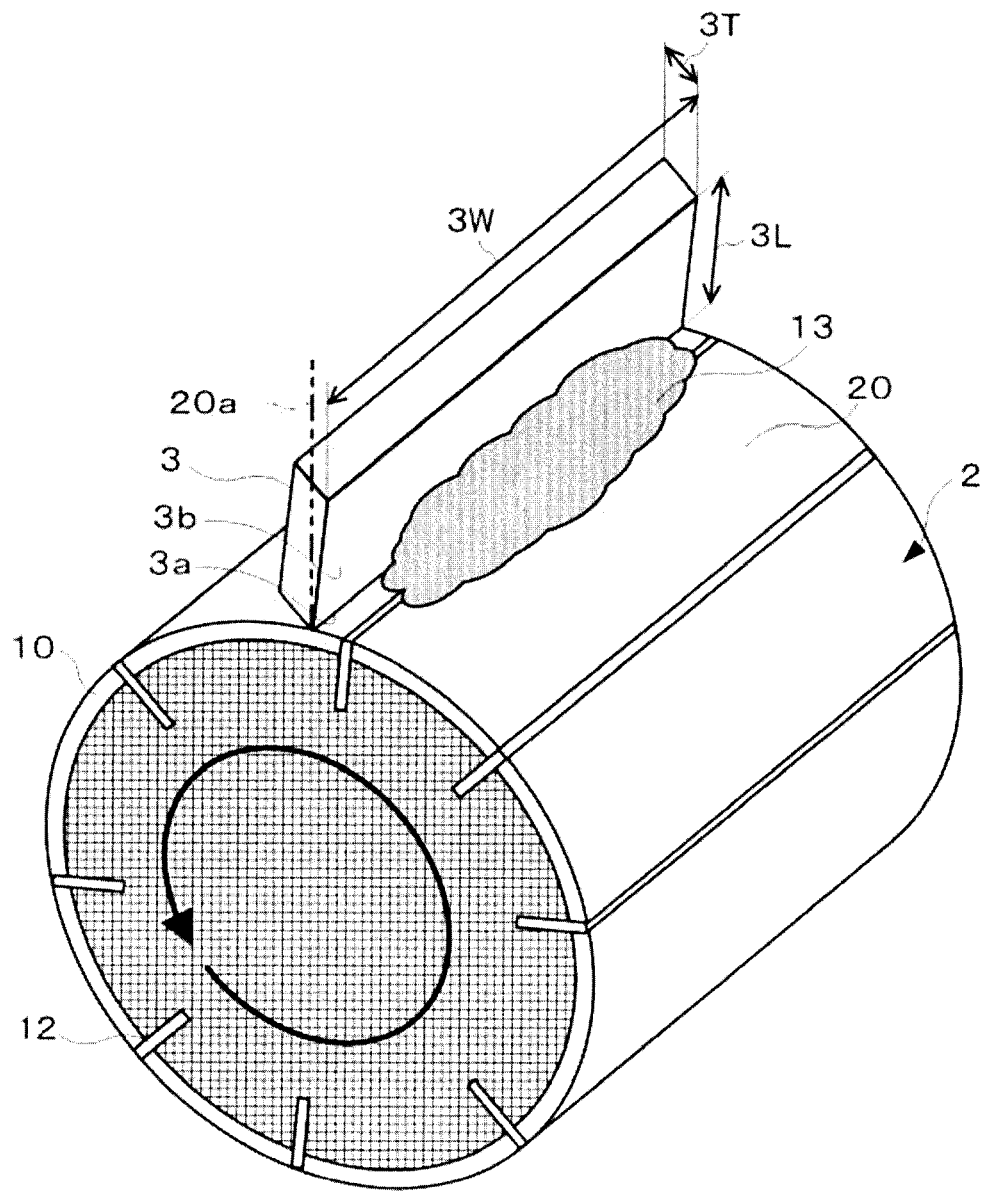
FIG. 3 is an explanatory view showing a filling step in FIG. 2.
Figure 4:
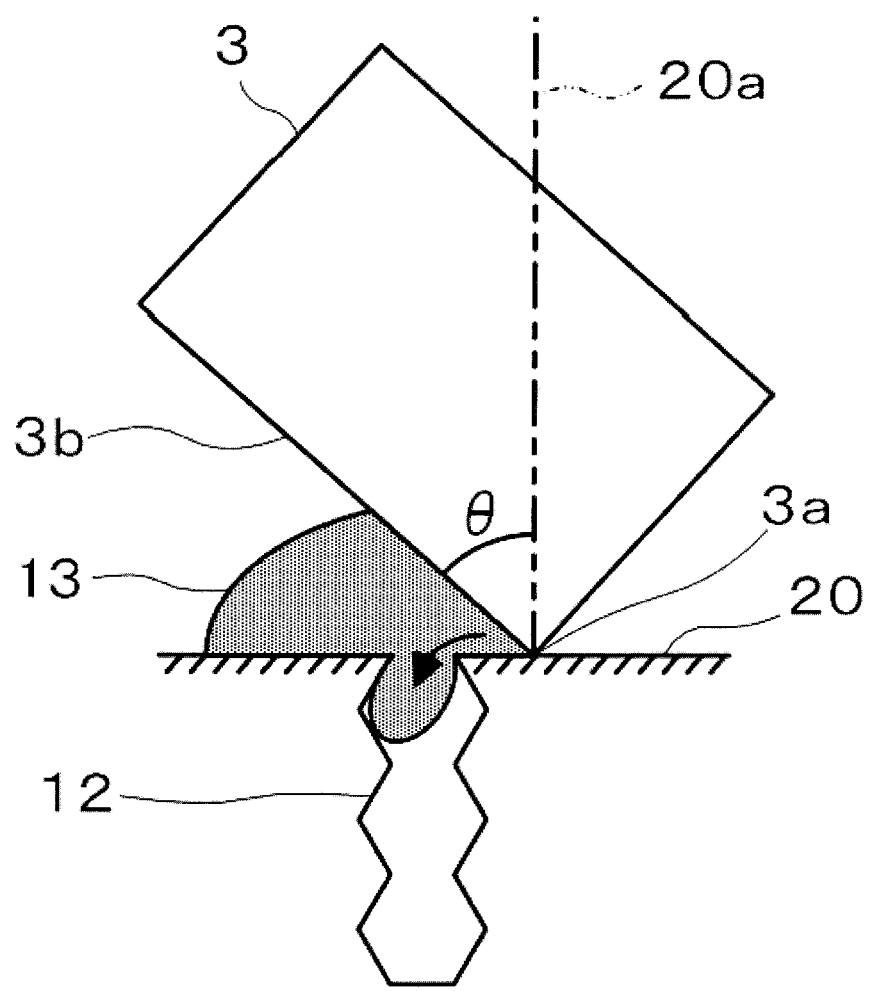
FIG. 4 is an explanatory view showing how a slit is filled with a filling material in FIG. 3.

Next, FIG. 2 is a flowchart showing a method for producing the honeycomb structure 1, for producing the honeycomb structure 1 in FIG. 1, and FIG. 3 is an explanatory view showing a filling step (step S2) in FIG. 2, and FIG. 4 is an explanatory view showing how the slit 12 is filled with the filling material 13 in FIG. 3.

As shown in FIG. 2, the method for producing the honeycomb structure 1 includes a preparation step (Step S1) and a filling step (Step S2).

The preparation step (Step S1) is to prepare a honeycomb structure element 2 (see FIG. 3) provided with the slits 12. The configuration of the honeycomb structure element 2 is the same as that of the honeycomb structure 1 as described above, with the exception that the slits 12 are not filled with the filling material 13.

As shown in FIG. 3, the filling step (step S2) is to fill the slits 12 with the filling material 13 by a contacting member 3 to obtain the honeycomb structure 1, by feeding the filling material 13 to an outer peripheral surface 20 of the honeycomb structure element 2, and rotating the honeycomb structure element 2 while pressing a tip portion 3a of the contacting member 3 inclined at an angle to a normal line 20a of the outer peripheral surface 20 of the honeycomb structure element 2 against the outer peripheral surface 20 with a force (see FIG. 1). The outer peripheral surface 20 of the honeycomb structure element 2 can be understood as an outer surface of the outer peripheral wall 10. The normal line 20a of the outer peripheral surface 20 is a normal line in a region where the contacting member 3 contacts the honeycomb structure element 2 (e.g., a region in the linear contact area).

In the filling step (Step S2), the honeycomb structure element 2 can be supported such that the axial direction of the honeycomb structure element 2 extends in the horizontal direction. Further, the honeycomb structure element 2 can be supported such that it can be rotated around a straight line passing through the axial center position of the honeycomb structure element 2 (a straight line passing through the center positions of the end faces of the honeycomb structure element 2 in the radial or width direction and extending in the axial direction of the honeycomb structure element 2). In other words, the rotation axis of the honeycomb structure element 2 in the filling step (step S2) can be coaxial with the honeycomb structure element 2. For the supporting of the honeycomb structure element 2, a predetermined device can be used.

The filling material 13 can be fed to an upper portion of the honeycomb structure element 2 while supporting the honeycomb structure element 2 such that the axial direction extends in the horizontal direction. The filling agent 13 can be fed at a position that is downstream of a top portion (a portion located at the highest point in the vertical direction) of the honeycomb structure element 2 supported such that the axial direction extends in the horizontal direction and is in the rotation direction of the honeycomb structure element 2, a position that is upstream of the top portion, or a position at the top portion. When fed to the top portion of the honeycomb structure element 2, the filling material 13 preferably has a viscosity of from 100 to 1000 P (from 10 to 100 Pa·s). The viscosity in such a range can allow the filling material 13 to be spread more smoothly at the upper portion of the honeycomb structure element 2, and can also prevent the filling material 13 from dripping from the upper portion of the honeycomb structure element 2.

The contacting member 3 may preferably have a blade shape. The contacting member 3 can be a member called a spatula. The contacting member 3 may preferably be flexible, and for example, a member made of urethane having a Shore A hardness of from 50 to 98 can be used. The contacting member 3 may have any outer shape, but the contacting member 3 having a width 3W greater than or equal to the axial length of each slit provided on the outer peripheral surface 20 of the honeycomb structure element 2 can be used. Preferably, the contacting member 3 may have a width equal to the axial length of the honeycomb structure element 2. As used herein, the concept of "equal" may include not only strictly equal but also substantially equal. The contacting member 3 can have, for example, a length 3L of from 30 to 70 mm, and the contacting member 3 can have, for example, a thickness 3T of from 3 to 15 mm.

The contacting member 3 can be supported such that the tip portion 3a can be pressed against the outer peripheral surface 20. The contacting member 3 can be supported such that the tip portion 3a is retractable in the direction of approaching and leaving the outer peripheral surface 20. The position of the honeycomb structure element 2 in the circumferential direction can be fixed, and the contacting member 3 can be supported such that the inclination angle relative to the normal line 20a and the pressing force against the outer peripheral surface 20 are constant. The concept of "constant" may include not only the absence of variation but also a variation in a predetermined range. For the support of the contacting member 3, a predetermined device can be used.

The inclination angle θ (see FIG. 4) of the contacting member 3 relative to the normal line 20a is preferably 30° or more and 75° or more. The contacting member 3 has an upstream end face 3b that is located upstream in the rotation direction of the honeycomb structure element 2. The inclination angle θ is understood as an angle between the upstream end surface 3b and the normal line 20a when the honeycomb structure element 2 and the contacting member 3 are viewed along the axial direction. The inclination angle θ of 30° or more can allow a force to push the filling material 13 into the slits 12, among forces applied to the filling material 13 by the contacting member 3 with rotation of the honeycomb structure element 2, to be sufficiently ensured. On the other hand, the inclination angle θ of 75° or less can allow a force to move the filling material 13 downstream, among the forces applied to the filling material 13 by the contacting member 3, to be sufficiently ensured. In other words, the inclination angle in the above range can lead to smooth pushing of the filling material 13 into the slits 12 and smooth movement of the filling material 13 downstream. It is more preferable that the inclination angle θ is 45° or more and 65° or less.

The pressing force of the tip portion 3a of the contacting member 3 against the outer peripheral surface 20 of the honeycomb structure element 2 is preferably 1 N or more and 150 N or less. The pressing force can be a value measured when a sensor is set in advance at a position where the tip portion 3a will be in contact with the outer peripheral surface 20, and the contacting member 3 is pressed against the sensor as in the case when the filling material 13 is filled. For example, a push-pull gauge or the like can be used as the sensor for measuring the pressing force. The pressing force of 1 N or more can facilitate the smooth movement of the filling material 13 by the contacting member 3. The pressing force of 150 N or less can reduce a risk that the honeycomb structure element 2 is damaged by the contact with the contacting member 3. In other words, the pressing force in the above range enables the smooth movement of the filling material 13 while reducing the risk that the honeycomb structure element 2 is damaged. It is more preferable that the pressing force is 100 N or more and 130 N or less.

It is preferable to rotate the honeycomb structure element 2 by one or more revolutions and 50 or less revolutions while pressing the tip portion 3a of the contacting member 3 against the outer peripheral surface 20 of the honeycomb structure element 2. One or more revolutions facilitates sufficient filling of the slits 12 with the filling material 13. On the other hand, even if the number of revolutions is more than 50, a sufficient amount of the filling material 13 has already been filled in the slits 12, so that a further increasing amount of the filling material 13 filled in the slits 12 may no longer be expected. The number of revolutions of the honeycomb structure element 2 is preferably 7 or more and 20 or less.

The filling step (Step S2) is preferably carried out under a humidity controlled environment of 30 RH % or more. This is because the drying of the filling material 13 is suppressed to enable smooth filling of the slits 12 with the filling material 13. During filling of the filler 13, the honeycomb structure element 2 may be rotatably supported in a certain casing, and the interior of the casing can be the humidity controlled environment. The humidity controlled environment during the filling step is more preferably 60 RH % or higher, and even more preferably 80 RH % or higher. The upper limit is not particularly limited, but theoretically, it is 100% or less. After filling of the filling material 13, it may be dried as needed.

It is preferable that the rotation speed of the honeycomb structure element 2 is 30 rpm or more and 120 rpm or less. The rotation speed of 30 rpm or more can keep a time required for rotating the honeycomb structure 2 by a predetermined number of times to be within a predetermined time, and can avoid drying of the filling material 13 during the step. The rotation speed of 120 rpm or less can suppress a risk that the filling material 13 is difficult to enter the slits 12. The rotation speed of the honeycomb structure element is more preferably 50 rpm or more and 70 rpm or less.

Figure 5:
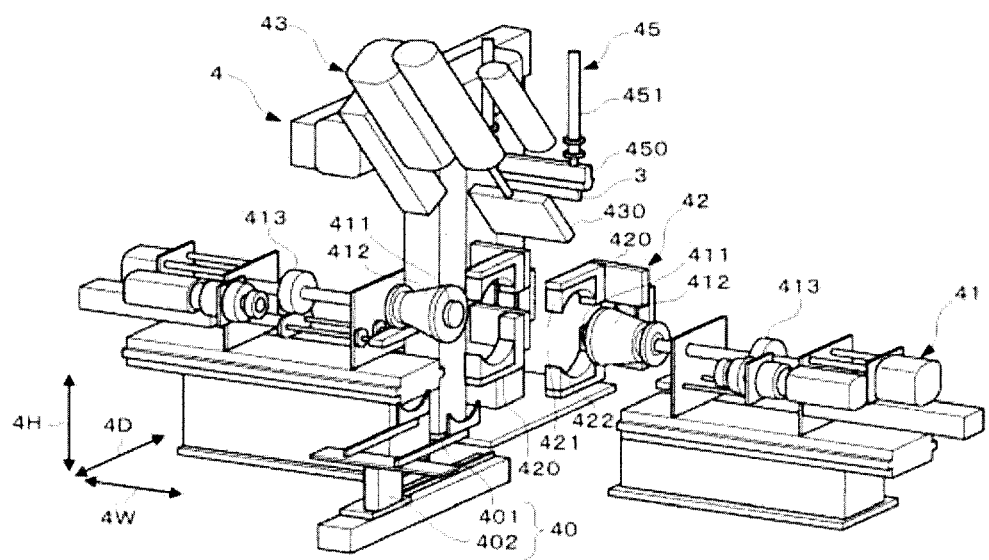
FIG. 5 is a perspective view showing a device for producing a honeycomb structure, which can be used in the filling step in FIG. 2.

Next, FIG. 5 shows a view of a production device 4 for the honeycomb structure 1, which can be used for the filling step (Step S2) in FIG. 2. The production device 4 as shown in FIG. 5 is a device for supporting the honeycomb structure element 2 and the contacting member 3, and filling the filling material 13 in the slits 12 of the honeycomb structure element 2 by the contacting member 3 to obtain the honeycomb structure 1. The production device 4 may be referred to as a filling device for the filling material 13.

Hereinafter, each portion of the production device 4 may be described using the terms "width direction 4W", "depth direction 4D" and "height direction 4H" of the production device 4. These width direction 4W, depth direction 4D and height direction 4H are directions that intersect with one another, and more specifically, may be directions orthogonal to one another. The width direction 4W and the depth direction 4D may follow the horizontal direction, and the height direction 4H may follow the vertical direction. The terms "back" and "front" may be used in relation to the depth direction 4D. The term "above" or the like may be used in relation to the height direction 4H.

As shown in FIG. 5, the production device 4 has an introduction portion 40, an element support portion 41, an axial center position adjustment portion 42, a filling material feed portion 43, and a contacting member support portion 45.

The introduction portion 40 is disposed at the front side in the depth direction 4D. The introduction portion 40 has a support table 401 and a moving mechanism 402. The support table 401 is a table for supporting the honeycomb structure element 2. The support table 401 can support the honeycomb structure element 2 such that the axial direction of the honeycomb structure element 2 is along the width direction 4W. The moving mechanism 402 supports the support table 401 so that it can move in the height direction 4H and in the depth direction 4D. The moving mechanism 402 allows the support table 401 and the honeycomb structure element 2 to move between a set position and a filling position. The set position is a position for an operator or the like to set the honeycomb structure element 2 onto the support table 401. The filling position is a position for filling the slits 12 of the honeycomb structure element 2 with the filling material 13. The filling position can be at a position that is back and upward the set position.

The element support portion 41 is disposed at the back of the feeding portion 40 and is a portion for rotatably supporting the honeycomb structure element 2 when the honeycomb structure element 2 is in the filling position. The element support portion 41 includes a pair of first gripping portions 411, a pair of second gripping portions 412, and a drive portion 413.

The first and second gripping portions 411, 412 are provided such that each of them is retractable in the width direction 4W and is rotatable. The first gripping portions 411 may be provided separately from the second gripping portions 412 in a retractable and/or rotatable manner. The first and second gripping portions 411, 412 can sandwich the honeycomb structure element 2 from the both sides in the extending direction (axial direction) of the cells 11a when the honeycomb structure element 2 is in the filling position.

The first and second gripping portions 411, 412 are coaxial with each other. The first gripping portions 411 have a smaller diameter than that of the second gripping portions 412, and sandwich the central portion of the honeycomb structure element 2 in the radial direction. The second gripping portions 412 have a larger diameter than that of the first gripping portions 411 and sandwich the outer peripheral portion of the honeycomb structure element in the radial direction. Each of the second gripping portions 412 according to this embodiment has the same outer diameter as that of the honeycomb structure element 2. The second gripping portions 412 may be interchangeable with other second gripping portions 412 each having a different outer diameter depending on the honeycomb structure element 2 to be filled.

The drive portion 413 is connected to the first and second gripping portions 411, 412. The driving force of the drive portion 413 can drive the first and second gripping portions 411, 412 to move forward and backward in the width direction 4W and to rotate them. By controlling the drive portion 413, the gripping pressure of the second gripping section 412 can be switched. As will be described later, the gripping pressure of the second gripping portions 412 when the axial center positions are aligned by the axial center position adjustment portion 42 may be lower than that of the second gripping portions 412 when the filling material 13 is filled, and may be about half (such as 45%) of that gripping pressure.

The axial center position adjustment portion 42 is a portion for simultaneously sandwiching the second gripping portions 412 and the honeycomb structure element 2 from the radially outer side, and aligning the axial center positions of the second gripping portions 412 and the honeycomb structure element 2.

The axial center position adjustment portion 42 according to this embodiment has a pair of work chucks 420 disposed so as to be spaced apart from each other in the width direction 4W. The work chucks 420 are arranged to be located at both ends in the axial direction of the honeycomb structure element 2 sandwiched by the second gripping portions 412, in the width direction 4W. Each work chuck 420 has an upper portion 421 and a lower portion 422 which are displaceable in a direction approaching to and separating from each other in the height direction 4H. The upper portion 421 and the lower portion 422 are displaceable in the opposite direction to each other and by the same amount in the height direction 4H around the axial center position of the second gripping portion 412. Each of the upper portion 421 and the lower portion 422 has a predetermined width in the width direction 4W. The upper portion 421 and the lower portion 422 are configured to be capable of simultaneously sandwiching the second gripping portion 412 and the honeycomb structure element 2 across the boundary between the second gripping portion 412 and the honeycomb structure element 2 when the upper portion 421 and the lower portion 422 are close to each other. When the axial center positions of the second gripping portions 412 and the honeycomb structure element 2 are misaligned before the sandwiching of the upper portion 421 and the lower portion 422, the honeycomb structure element 2 is moved in the height direction 4H until the axial center positions are aligned by the sandwiching of the upper portion 421 and the lower portion 422. As described above, when the axial center positions are aligned by the axial center position adjustment portion 42, the gripping pressure of the second gripping portions 412 is decrease to provide smoother movement of the honeycomb structure element 2 in the height direction 4H.

The filling material feed portion 43 is disposed above the filling position and is a portion for feeding the filling material 13 to the outer peripheral surface 20 of the honeycomb structure element 2 when the honeycomb structure element 2 is in the filling position. The filling material feed portion 43 includes a nozzle head 430 having a plurality of nozzles spaced apart from each other in the width direction 4W, and can feed the filling material 13 with a predetermined spread in the width direction 4W or in the axial direction of the honeycomb structure element 2.

The contacting member support portion 45 is disposed above the filling position and at the back of the filling material feed portion 43, and is a portion for pressing the tip portion 3a of the contacting member 3 inclined at an angle relative to the normal line 20a of the outer peripheral surface 20 of the honeycomb structure element 2 against the outer peripheral surface 20 of the honeycomb structure element 2 with a force, when the honeycomb structure element 2 is in the filling position.

The contacting member support portion 45 supports the contacting member 3. The contacting member support portion 45 is provided to be retractable in the height direction 4H, and can be lowered to press the tip portion 3*a* of the contacting member 3 against the outer peripheral surface 20 of the honeycomb structure element 2. The pressing force of the tip portion 3*a* against the outer peripheral surface 20 by the contacting member support portion 45 may be adjustable.

The contacting member support portion 45 may be able to support the contacting member 3 such that the inclination of the contacting member 3 relative to the normal line 20*a* can be adjusted. The contacting member support portion 45 may be inclinable such that the inclination of the contacting member 3 relative to the normal line 20*a* can be adjusted.

The contacting member support portion 45 includes a contacting member attachment portion 450 and a pair of supports 451. The contacting member attachment portion 450 is a member to which the contacting member 3 is detachably attached. The contacting member attachment portion 450 has a lower opening into which the contacting member 3 can be inserted, and also has a predetermined width in the width direction 4W. For example, the contacting member 3 can be attached to the contacting member attachment portion 450, such as by fixing the contacting member 3 inserted into the lower opening to the contacting member attachment portion 450 using fastening members (bolts, etc.). The pair of supports 451 supports the contacting member attachment portion 450 at positions spaced apart from each other in the width direction 4W, respectively. The pair of supports 451 may retractably support the contacting member attachment portion 450 in the length direction of the contacting member 3. The pair of supports 451 may have urging members (such as springs) for urging the contacting member attachment portion 450 so as to press the tip portion 3*a* of the contacting member 3 against the outer peripheral surface 20 of the honeycomb structure element 2. Even if there are variations in the outer shape of the honeycomb structure element 2, the contacting member attachment portion 450 can be urged to allow the tip portion 3*a* of the contacting member 3 to follow the outer peripheral surface 20 of the honeycomb structure element 2 more reliably.

Next, the operation of the production device 4 will be described. The operation of each portion of the production device 4 can be performed based on a signal(s) from a sensor(s) disposed in each part and/or a signal(s) input by an operator or the like via a predetermined interface. The production device 4 can be operated to implement the method for producing the honeycomb structure 1 as described above.

First, when the support table 401 is in a set position, the operator or the like sets the honeycomb structure element 2 on the support table 401. In this case, the axial direction of the honeycomb structure element 2 is oriented along the width direction 4W. After the honeycomb structure element 2 is set on the support table 401, the support table 401 and the honeycomb structure element 2 are moved to the filling position by the moving mechanism 402.

After the support table 401 and the honeycomb structure element 2 are moved to the filling position, the first gripping portions 411 grip the honeycomb structure element 2, while the support table 401 is returned to the set position. The second gripping portions 412 then grip the honeycomb structure element 2, and the axis center positions are aligned by the axis center position adjustment portion 42. In other words, the second gripping portions 412 and the honeycomb structure element 2 are simultaneously sandwiched from the radially outer side by the axial center position adjustment portion 42 to align the axial center positions of the second gripping portions 412 and the honeycomb structure element 2. After the axial center alignment is completed, the axial center position adjustment portion 42 is released from the second gripping portions 412 and the honeycomb structure element 2, and the gripping pressure of the honeycomb structure element 2 by the second gripping portions 412 is increased.

The filling material 13 is then fed to the outer peripheral surface 20 of the honeycomb structure element 2 by the filling material feed portion 43, and the contacting member support portion 45 is lowered so that the tip portion 3*a* of the contacting member 3 inclined at an angle relative to the normal line 20*a* of the outer peripheral surface 20 of the honeycomb structure element 2 is pressed against the outer peripheral surface 20 of the honeycomb structure element 2 with a predetermined force.

The first and second gripping portions 411, 412 are then driven to rotate them. Accordingly, the honeycomb structure element 2 is rotated and the filling material 13 is filled in the slits 12 by the contacting member 3 to obtain the honeycomb structure 1 having the slits 12 filled with the filling material 13. After the honeycomb structure 1 is obtained, the support table 401 is moved to the filling position and the honeycomb structure 1 is placed on the support table 401. Subsequently, the sandwiching of the honeycomb structure 1 by the first and second gripping portions 411, 412 is released, and the support table 401 and the honeycomb structure 1 are returned to the set position to enable the operator or the like to take out the honeycomb structure 1.

In the production method and device 4 for the honeycomb structure 1 according to the embodiment, the filling material 13 is fed to the outer peripheral surface 20 of the honeycomb structure element 2, and the honeycomb structure element 2 is rotated while pressing the tip portion 3*a* of the contacting member 3 inclined at an angle relative to the normal line 20*a* of the outer peripheral surface 20 of the honeycomb structure element 2 against the outer peripheral surface 20 with a predetermined force to fill the silts 12 with the filling material 13 by the contacting member 3 to obtain the honeycomb structure 1 having the slits 12 filled with the filling material 13. Therefore, a variation in the filling accuracy of the filling material 13 can be reduced.

Also, the inclination angle θ of the contacting member 3 relative to the normal line 20*a* is 30° or more and 75° or less, so that the filling material 13 can be pushed into the slits 12 and moved to the downstream side smoothly.

Further, the pressing force of the tip portion 3*a* of the contacting member 3 against the outer peripheral surface 20 is 1 N or more and 150 N or less, which enables smooth movement of the filling material 13 and reduces the risk of damage to the honeycomb structure element 2.

The honeycomb structure element 2 is rotated by one or more revolutions and 50 or less revolutions while pressing the tip portion 3*a* of the contacting member 3 against the outer peripheral surface 20, so that excessive rotation of the honeycomb structure element 2 can be avoided while reducing the risk that the slits 12 remain unfilled with the filling material 13.

The filling step (Step S2) is carried under a humidity controlled environment of 30 RH % or higher, so that the drying of the filling material 13 can be suppressed to enable smooth filling of the filling material 13 in the slits 12.

The rotational speed of the honeycomb structure element 2 is 30 rpm or more and 120 rpm or less, so that the risk of the filler material 13 becoming difficult to enter the slits 12 can be reduced while preventing the drying of the filler material 13 from proceeding during the filling step.

Further, the element support portion 41 has the pair of first gripping portions 411 and the pair of second gripping portions 412, so that the contact resistance with the honeycomb structure 1 is weak when it is held only by the second gripping portions 412, thereby enabling the axial center positions to be easily aligned. In addition, the holding of the honeycomb structure 1 with the first gripping portions 411 can lead to increased contact resistance, which can prevent the axial center position of the honeycomb structure 1 from shifting during the filling operation.

Furthermore, the axial center position adjustment portion 42 simultaneously sandwiches the second gripping portions 412 and the honeycomb structure element 2 from the radially outer side and aligns the axial center positions of the second gripping portions 412 and the honeycomb structure element 2, so that deviation of the honeycomb structure element 2 can be suppressed when rotating the honeycomb structure element 2 by the second gripping portions 412, and a variation in the filling accuracy of the filling material 13 can be reduced.

In addition, the gripping pressure of the second gripping portions 412 when the axial center positions are aligned by the axial center position adjustment portion 42 is lower than that of the second gripping portions 412 when the filling material 13 is filled, so that the honeycomb structure element 2 can be moved more smoothly when the axial center positions are aligned.

DESCRIPTION OF REFERENCE NUMERALS

1: honeycomb structure
10: outer peripheral wall
11: partition wall
11*a*: cell
12: slit
13: filling material
2: honeycomb structure element
20: outer peripheral surface
20*a*: normal line
3: contacting member
3*a*: tip portion
4: production device for honeycomb structure
41: element support portion
42: axial center position adjustment portion
43: filling material feed portion
45: contacting member support portion
411: first gripping portion
412: second gripping portion

The invention claimed is:

1. A method for producing a honeycomb structure, the honeycomb structure comprising:
an outer peripheral wall;
a partition wall arranged on an inner side of the outer peripheral wall, the partition wall defining a plurality of cells each extending from one end face to other end face to form a flow path;
a plurality of slits spaced apart from each other in a circumferential direction and extending inwardly in a radial direction from the outer peripheral wall, the plurality of slits being provided such that the outer peripheral wall is opened; and
a filling material filling each of the slits,
wherein the method comprises:
a preparation step of preparing a honeycomb structure element having the plurality of slits; and
a filling step of filling the plurality of slits with the filling material by a contacting member by feeding the filling material to an outer peripheral surface of the honeycomb structure element, and rotating the honeycomb structure element while pressing a tip portion of the contacting member inclined at an angle relative to a normal line of the outer peripheral surface of the honeycomb structure element against the outer peripheral surface with a force, to obtain the honeycomb structure having the plurality of slits filled with the filling material.

2. The method for producing a honeycomb structure according to claim 1, wherein an inclination angle θ of the contacting member relative to the normal line is 30° or more and 75° or less.

3. The method for producing a honeycomb structure according to claim 1, wherein a pressing force of the tip portion of the contacting member against the outer peripheral surface of the honeycomb structure element is 1 N or more and 150 N or less.

4. The method for producing a honeycomb structure according to claim 1, wherein the honeycomb structure element is rotated by one or more revolutions and 50 or less revolutions while pressing the tip portion of the contacting member against the outer peripheral surface of the honeycomb structure element.

5. The method for producing a honeycomb structure according to claim 1, wherein the contacting member has a blade shape.

6. The method for producing a honeycomb structure according to claim 1, wherein the filling step is carried under a humidity controlled environment of 30 RH % or higher.

7. The method for producing a honeycomb structure according to claim 1, wherein a rotational speed of the honeycomb structure element is 30 rpm or more and 120 rpm or less.

* * * * *